United States Patent
Cotta et al.

(10) Patent No.: US 10,235,514 B2
(45) Date of Patent: Mar. 19, 2019

(54) GAME CONTROLLER-BASED CAPTCHA

(71) Applicant: Sony Interactive Entertainment America LLC, San Mateo, CA (US)

(72) Inventors: Bryan Cotta, San Mateo, CA (US); Warren Benedetto, San Mateo, CA (US)

(73) Assignee: SONY INTERACTIVE ENTERTAINMENT AMERICA LLC, San Mateo, CA (US)

(*) Notice: Subject to any disclaimer, the term of this patent is extended or adjusted under 35 U.S.C. 154(b) by 83 days.

(21) Appl. No.: 15/282,151

(22) Filed: Sep. 30, 2016

(65) Prior Publication Data
US 2018/0096124 A1    Apr. 5, 2018

(51) Int. Cl.
| G06F 21/00 | (2013.01) |
| G06F 21/36 | (2013.01) |
| G06F 3/02 | (2006.01) |
| G06F 21/45 | (2013.01) |
| G06F 21/31 | (2013.01) |

(52) U.S. Cl.
CPC .......... *G06F 21/36* (2013.01); *G06F 3/0219* (2013.01); *G06F 21/31* (2013.01); *G06F 21/45* (2013.01); *G06F 2221/2133* (2013.01)

(58) Field of Classification Search
None
See application file for complete search history.

(56) References Cited

U.S. PATENT DOCUMENTS

| 5,718,634 A | 2/1998 | Mikeska et al. |
| 9,652,604 B1* | 5/2017 | Johansson .............. G06F 21/36 |
| 2004/0139254 A1* | 7/2004 | Tu ........................ G06F 3/0236 710/73 |
| 2009/0235327 A1* | 9/2009 | Jakobsson .............. G06F 21/31 726/2 |
| 2009/0325661 A1* | 12/2009 | Gross ..................... A63F 13/12 463/9 |

* cited by examiner

*Primary Examiner* — John B King
(74) *Attorney, Agent, or Firm* — John L. Rogitz

(57) ABSTRACT

A CAPTCHA is presented on a display and a user of a hand-held controller such as a computer game controller is prompted to respond to the image. A correct response entails manipulation of a key on the controller and does not require input from an alpha-numeric keyboard.

18 Claims, 5 Drawing Sheets

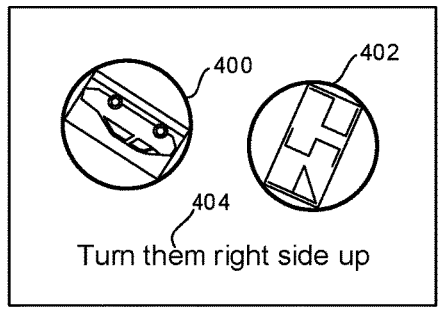
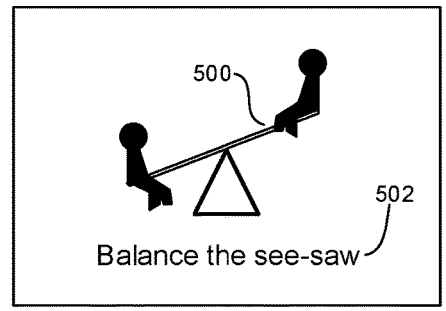
FIG. 4  FIG. 5
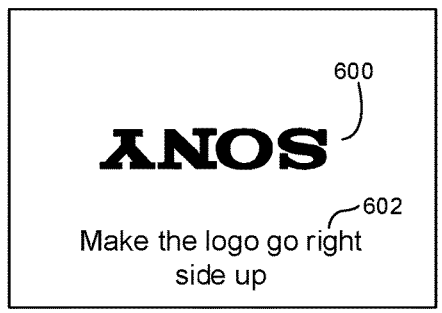
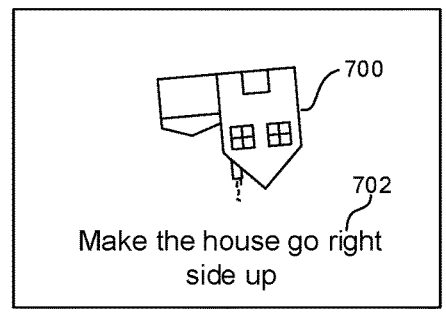
FIG. 6  FIG. 7
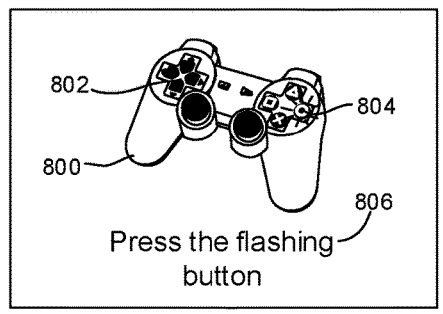
FIG. 8

GAME CONTROLLER-BASED CAPTCHA

FIELD

The application relates generally to game controller-based CAPTCHA.

BACKGROUND

As understood herein, web-based services and sites that require little or no user/client authentication but consume a non-trivial portion of cloud resources are subject to automated spamming or attacks. An adversary can set up an automated bot that can flood the web server with requests much faster than any set of humans could issue those requests. As a result, there exists a need to validate whether a request is coming from a human or from an automated attack bot/software.

The industry standard is to employ a CAPTCHA (Completely Automated Public Turing test to tell Computers and Humans Apart). However, conventional CAPTCHAs are often cumbersome for users to input. Furthermore, conventional CAPTCHAs are even more difficult to enter with devices such as but not limited to game controller devices that have limited inputs (as opposed to a keyboard and mouse with a much greater input space).

SUMMARY

Present principles are directed to a high-assurance CAPTCHA that is both secure (i.e. able to tell a human from a bot) and easy to enter with a video game controller.

Accordingly, a device includes one or more computer memories that are not a transitory signal and that include instructions executable by at least one processor to present on a display at least one image. The instructions are executable to present on the display a prompt to respond to the image, in which responding to the image does not require use of an alpha-numeric keyboard. Furthermore, the instructions are executable to, responsive to receiving, from a hand-held computer controller, a signal to respond to the image, determine whether the signal correctly alters the image. The instructions are further executable to, responsive to determining that the signal correctly responds to the image, permit access to at least one computerized feature, and responsive to determining that the signal does not correctly respond to the image, not permit access to the at least one computerized feature.

The computerized feature may be a computer game.

In one non-limiting example, the hand-held computer controller generating the signal includes left and right handles each defining a top surface, with each top surface having four manipulable keys disposed thereon. In another non-limiting example, the hand-held computer controller generating the signal includes left and right side surfaces grippable by a person, with four manipulable keys being arranged in a cruciform arrangement adjacent one of the side surfaces.

In example embodiments, the image includes a see-saw to be balanced by input from the hand-held computer controller, or an image of an object to be turned right side up by input from the hand-held computer controller, or an image of the hand-held computer controller itself, with a key on the image of the controller being highlighted. In this last implementation a correct response to the image is established by a signal indicating manipulation of the corresponding key on the hand-held computer controller.

In another aspect, a method includes presenting on a display a Completely Automated Public Turing test to tell Computers and Humans Apart (CAPTCHA), and prompting response to the CAPTCHA using a controller with no alpha-numeric keyboard. The method includes, responsive to receiving a correct response to the CAPTCHA, permitting a computer access, whereas responsive to not receiving a correct response to the CAPTCHA, not permitting the computer access.

In another aspect, an apparatus includes a processor and storage accessible to the processor with instructions executable by the processor to generate an image on a display. The instructions are executable to receive input from a controller pertaining to the image, and responsive to a determination that the input correctly pertains to the image, permit access. However, the instructions also are executable to, responsive to a determination that the input incorrectly pertains to the image, not permit access.

The details of the present application, both as to its structure and operation, can best be understood in reference to the accompanying drawings, in which like reference numerals refer to like parts, and in which:

BRIEF DESCRIPTION OF THE DRAWINGS

FIGS. 4-8 are screen shots of example CAPTCHAs consistent with present principles.

DETAILED DESCRIPTION

Figure 1:
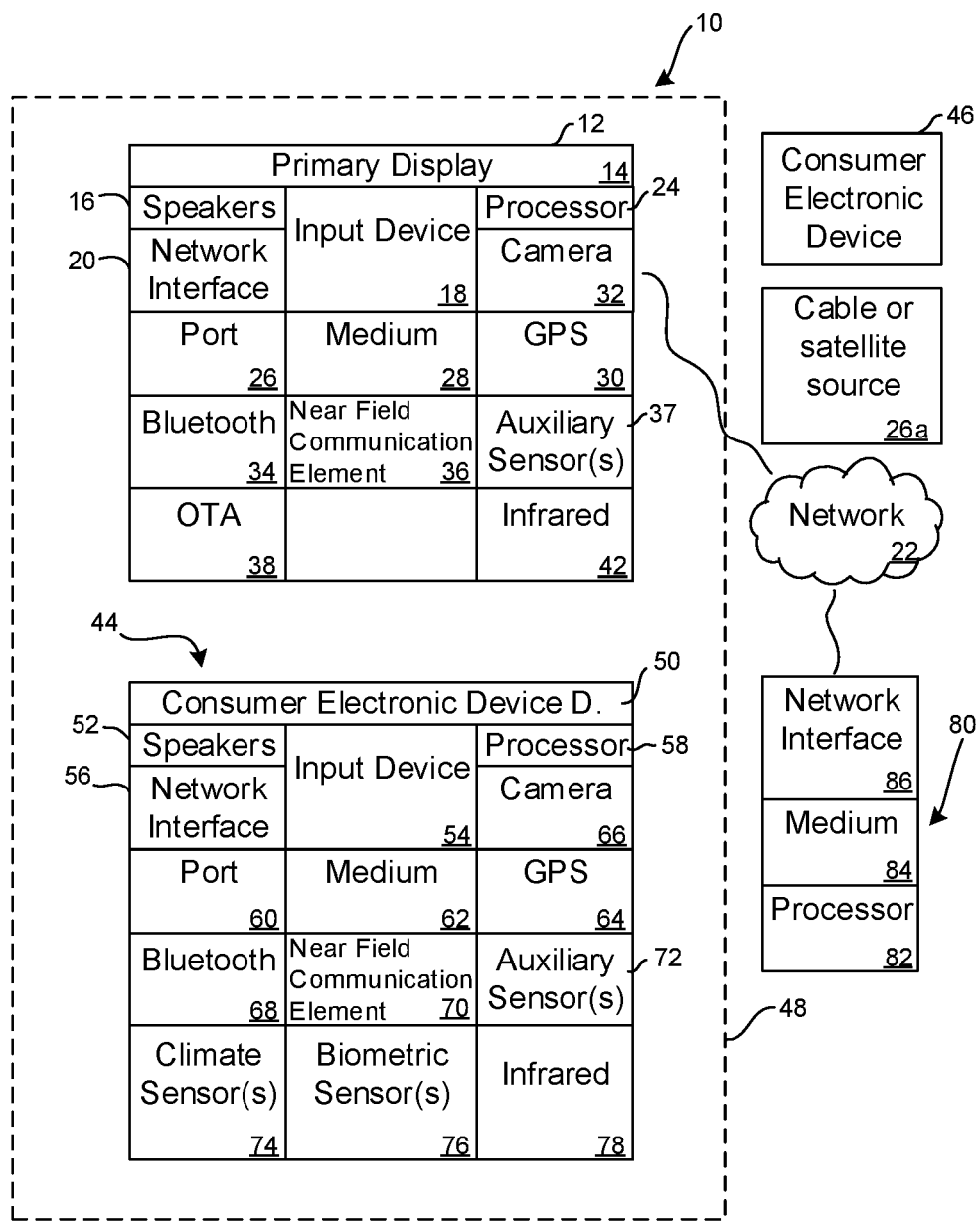
FIG. 1 is a block diagram of an example system including an example in accordance with present principles.

This disclosure relates generally to computer ecosystems including aspects of consumer electronics (CE) device networks such as but not limited to distributed computer game networks. A system herein may include server and client components, connected over a network such that data may be exchanged between the client and server components. The client components may include one or more computing devices including game consoles such as but not limited to Sony PlayStation™ and Microsoft Xbox™, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used. As alluded to above, the CE device 44/46 and/or the source 26a may be implemented by a game console. Or, one or more of the CE devices 44/46 may be implemented by devices sold under the trademarks Google Chromecast, Roku, Amazon FireTV.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a game controller communicating via wired or wireless link with a game console implemented by the second CE device 46 and controlling video game presentation on the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver. Typically, the server 80 includes multiple processors in multiple computers referred to as "blades".

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
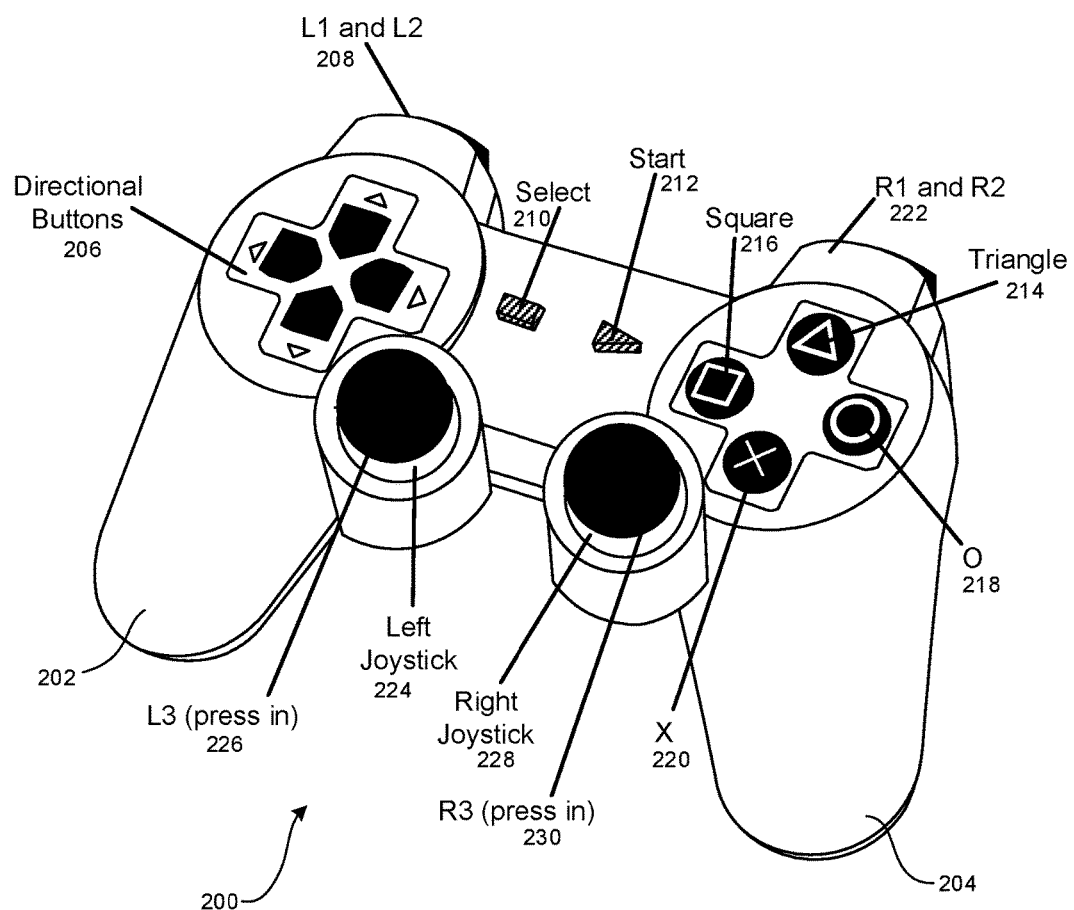
FIG. 2 is a perspective view of a first example controller that may be used to respond to CAPTCHA.
Figure 3:
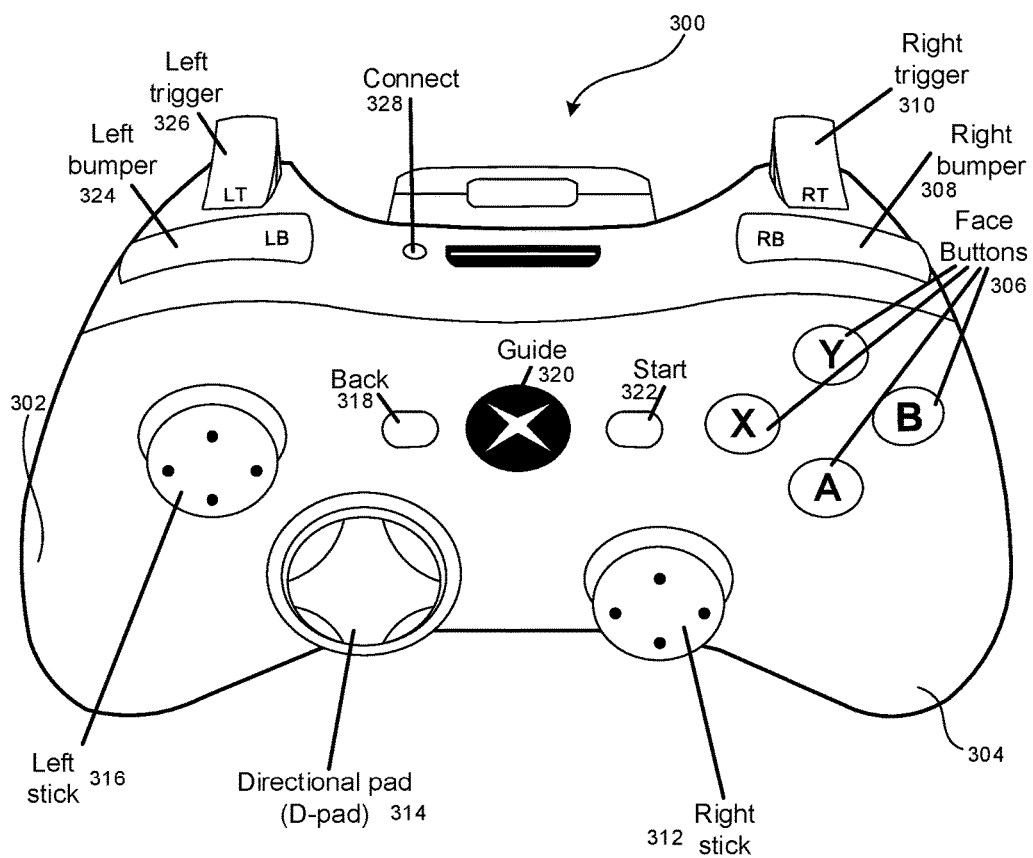
FIG. 3 is a perspective view of a second example controller that may be used to respond to CAPTCHA.

FIGS. 2 and 3 show non-limiting examples of game controllers that may be used according to present principles. It is to be understood that a game controller can incorporate one or more of the components discussed above to communicate with a display such as any of those described herein to control a computer game.

FIG. 2 shows a controller 200 that includes a lightweight hand-held housing with round, generally cylindrically-shaped left and right handles 202, 204, each defining a top surface on which four manipulable keys disposed thereon. For example, four directional keys 206 are arranged in a cruciform pattern on the top of the left handle 202. The keys 206 can be used to cause an object to move in the respective direction on a display.

Additional L1 and L2 keys 208 may be provided just forward of the left handle 202. A bridge connects the handles 202, 204 and a select key 210 may be disposed on the bridge along with a start key 212.

The four keys on the right handle 204 may include a triangle key 214, a square key 216, and "O" key 218, and an "X" key 220, each of which may assume a respective function according to the game designer's wishes. Additional R1 and R2 keys 222 may be provided just forward of the right handle 204.

Also, between the handles 202, 204 a left joystick 224 may be provided just inboard of the left handle 202. The left joystick 224 may include a depressible top 226. Likewise, a right joystick 228 may be provided just inboard of the right handle 204. The right joystick 228 may include a depressible top 230.

In contrast, the example controller 300 shown in FIG. 3 may include a lightweight hand-held housing with left and right side surfaces 302, 304 that are grippable by a person. Four manipulable keys 306 are arranged in a cruciform arrangement adjacent the right surface 304 as shown. A right bumper 308 may be disposed just forward of the keys 306 and forward of that, a right trigger element 310 may be disposed.

Behind and somewhat inboard of the keys 306, a right joystick 312 may be disposed on the controller. Also, left of the joystick 312 a directional pad 314 may be provided. Left and forward of the pad 314, a left joystick 316 may be disposed on the controller. Back, guide, and start keys 318, 320, 322 may be disposed centrally on the controller.

Keys 324, 326 may be disposed forward of the left stick 316 to mirror the right elements 308, 310. A forward, generally centrally located connect key 328 may also be provided.

FIGS. 4-8 illustrate example CAPTCHA images that may be presented on a display such as any of the displays disclosed herein that may be responded to by a controller such as the example controllers shown in FIGS. 2 and 3, which need not have an alpha-numeric keyboard with which to successfully react or respond to the CAPTCHA images. In FIG. 4, one or more randomly tilted (from the horizontal) images 400, 402 may appear along with a prompt 404 to turn the images right side up. To respond, the user must manipulate the controller stick or directional pad described above to rotate the image until it is right-side-up. A tunable tolerance may he provided to allow for small deviations from perfect alignment. Alignment of an image right side up results in a successful CAPTCHA response to the image.

FIG. 5 shows a see-saw image 500 and a prompt 502 to balance an unbalanced see-saw. This may be successfully done by a user appropriately manipulating predetermined keys such as the trigger keys shown in FIG. 3 or other keys in FIG. 2.

FIGS. 6 and 7 show that instead of righting the images of FIG. 4, respective images 600, 700 of a logo or an object such as a house may appear upside down with respective prompts 602, 702 to turn the images right side up using predetermined keys on the controller. A human user can easily recognize right side up whereas a computerized bot may not know which side is right side up for any given image.

Yet again, FIG. 8 shows that an image 800 of the controller being used may be presented on the display, complete with images 802 of the keys of the controller. One of the keys 804 is highlighted as by flashing, with a prompt 806 for the user to manipulate the corresponding key on the real world controller that corresponds to the highlighted key 804.

More generally, pictures (not text or other easily-interpreted data) can be flashed across the screen corresponding to different controller buttons or keys. The user must enter the button in a predetermined period of time for a successful CAPTCHA response to be determined. These pictures preferably are altered slightly each time they are used.

Figure 9:
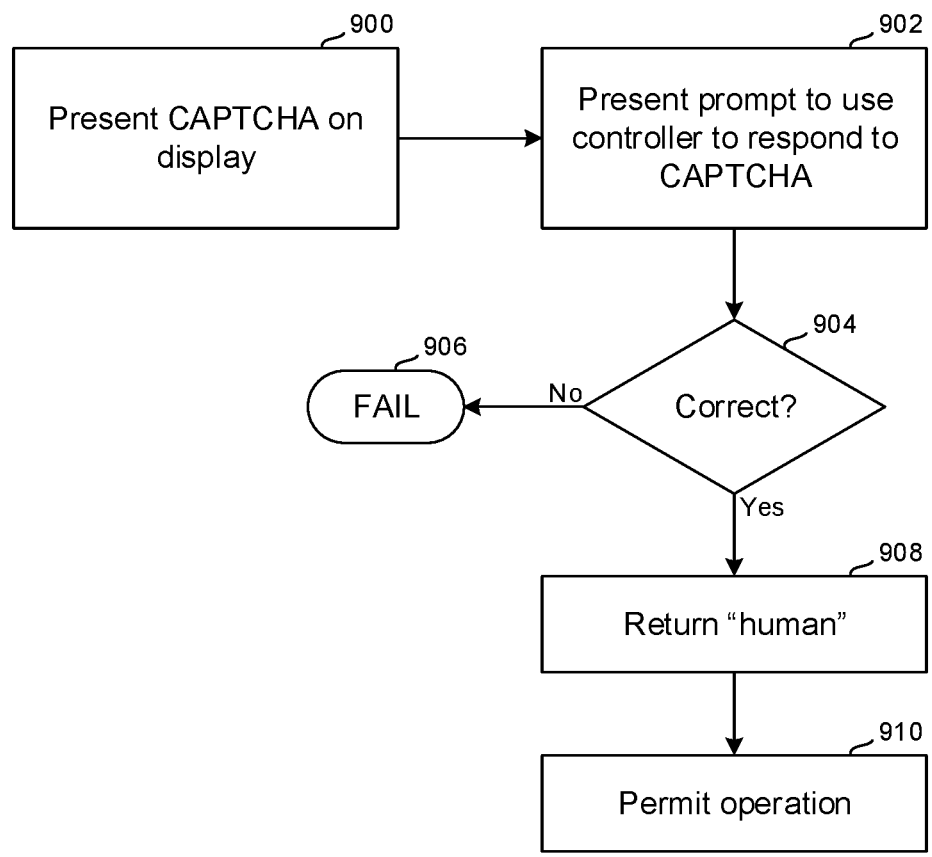
FIG. 9 is a flow chart of example logic.

FIG. 9 begins at state 900 in which any of the CAPTCHAs described herein are presented on a display. If desired, an appropriate prompt may also be presented at block 902 to respond to the CAPTCHA. If it is determined at decision diamond 904 that an appropriate response was not received within, e.g., a timeout period, a "fail" is returned at state 906 and the computer feature or operation sought to be protected by the CAPTCHA is not unlocked.

However, if it is determined at decision diamond 904 that an appropriate response is indeed received within, e.g., a timeout period, the logic may infer "human" user at block 908 and accordingly unlock or otherwise permit access of the computer feature or operation sought to be protected by the CAPTCHA.

It will be appreciated that whilst present principals have been described with reference to some example embodiments, these are not intended to be limiting, and that various alternative arrangements may be used to implement the subject matter claimed herein.

What is claimed is:

1. A device comprising:
   at least one computer memory that is not a transitory signal and that comprises instructions executable by at least one processor to:
   present on a display at least one image;
   present on the display a prompt to respond to the image, responding to the image not requiring use of an alpha-numeric keyboard;
   responsive to receiving, from a hand-held computer controller, a signal to respond to the image, determine whether the signal correctly alters the image;
   responsive to determining that the signal correctly responds to the image, permit access to at least one computerized feature; and
   responsive to determining that the signal does not correctly respond to the image, not permit access to the at least one computerized feature, wherein the at least one image includes an image of the hand-held computer controller with a key on the image being highlighted, a correct response to the image being established by a signal indicating manipulation of the corresponding key on the hand-held computer controller.

2. The device of claim 1, wherein the computerized feature is a computer game.

3. The device of claim 1, wherein the hand-held computer controller generating the signal includes left and right handles each defining a top surface, each top surface having four manipulable keys disposed thereon.

4. The device of claim 1, wherein the hand-held computer controller generating the signal includes left and right side surfaces grippable by a person, four manipulable keys being arranged in a cruciform arrangement adjacent one of the side surfaces.

5. The device of claim 1, wherein the at least one image includes a. see-saw to be balanced by input from the hand-held computer controller.

6. The device of claim 1, wherein the at least one image includes an image of an object to be turned right side up by input from the hand-held computer controller.

7. The device of claim 1, comprising the at least one processor.

8. An apparatus, comprising:
   a processor;
   storage accessible to the processor and bearing instructions executable by the processor to:
   generate an image on a display;
   receive input from a controller pertaining to the image;
   responsive to a determination that the input correctly pertains to the image, permit access; and
   responsive to a determination that the input incorrectly pertains to the image, not permit access, the controller configured in at least one of:
   a first configuration in which the controller comprises left and right handles each defining a top surface, each top surface having four manipulable keys disposed thereon;
   a second configuration in which the controller comprises left and right side surfaces grippable by a person, four manipulable keys being arranged in a cruciform arrangement adjacent one of the side surfaces.

9. The apparatus of claim 8, wherein the input is received from a hand-held controller having no alpha-numeric keyboard.

10. The apparatus of claim 9, wherein the image includes a see-saw to be balanced by input from the hand-held controller.

11. The apparatus of claim 9, wherein the image includes an image of an object to be turned right side up by input from the hand-held controller.

12. The apparatus of claim 9, wherein the image includes an image of the hand-held controller with a key on the image being highlighted, a correct response to the image being established by a signal indicating manipulation of the corresponding key on the hand-held controller.

13. A method, comprising:
   presenting on a display at least one image;
   presenting on the display a prompt to respond to the image, responding to the image not requiring use of an alpha-numeric keyboard;
   responsive to receiving, from a hand-held computer controller, a signal to respond to the image, determining whether the signal correctly alters the image;
   responsive to determining that the signal correctly responds to the image, permitting access to at least one computerized feature; and
   responsive to determining that the signal does not correctly respond to the image, not permitting access to the at least one computerized feature, wherein the at least one image includes an image of the hand-held computer controller with a key on the image being highlighted, a correct response to the image being established by a signal indicating manipulation of the corresponding key on the hand-held computer controller.

14. The method of claim 13, wherein the computerized feature is a computer game.

15. The method of claim 13, wherein the hand-held computer controller generating the signal includes left and right handles each defining a top surface, each top surface having four manipulable keys disposed thereon.

16. The method of claim 13, wherein the hand-held computer controller generating the signal includes left and right side surfaces grippable by a person, four manipulable keys being arranged in a cruciform arrangement adjacent one of the side surfaces.

17. The method of claim 13, wherein the at least one image includes a see-saw to be balanced by input from the hand-held computer controller.

18. The method of claim 13, wherein the at least one image includes an image of an object to be turned right side up by input from the hand-held computer controller.

* * * * *